A. E. PAIGE.
MULTIFOCAL OPTICAL ELEMENT AND METHOD AND MEANS FOR MAKING THE SAME.
APPLICATION FILED NOV. 4, 1920.
Reissued Dec. 14, 1920. 15,007.
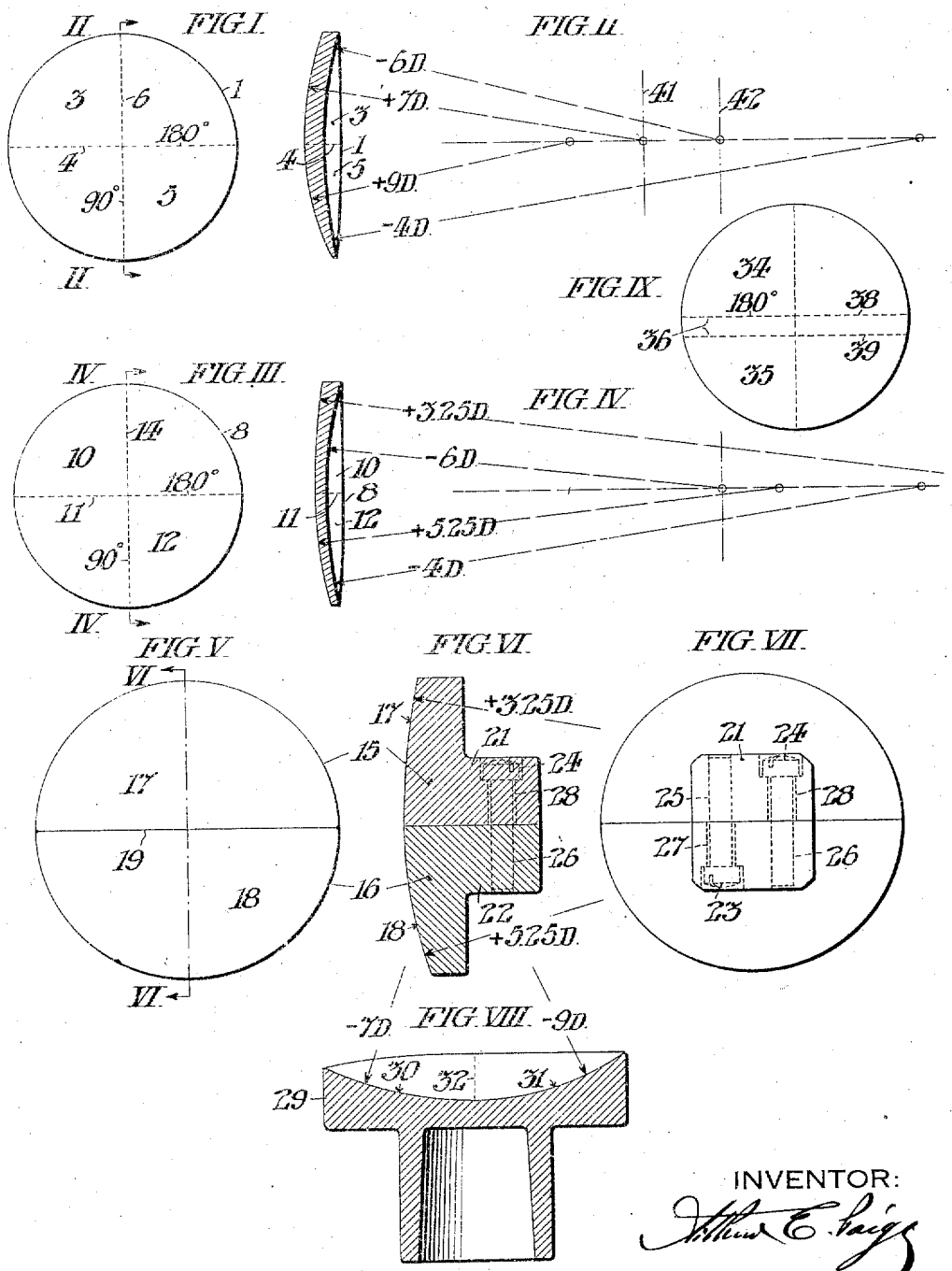
INVENTOR:
Arthur E. Paige

UNITED STATES PATENT OFFICE.

ARTHUR E. PAIGE, OF PHILADELPHIA, PENNSYLVANIA.

MULTIFOCAL OPTICAL ELEMENT AND METHOD AND MEANS FOR MAKING THE SAME.

15,007. Specification of Reissued Letters Patent. Reissued Dec. 14, 1920.

Original No. 1,351,785, dated September 7, 1920, Serial No. 332,525, filed October 22, 1919. Application for reissue filed November 4, 1920. Serial No. 422,104.

*To all whom it may concern:*

Be it known that I, ARTHUR E. PAIGE, a citizen of the United States, residing at Philadelphia, in the county of Philadelphia and State of Pennsylvania, have invented a certain new and useful Improvement in Multifocal Optical Elements and Methods and Means for Making the Same, whereof the following is a specification, reference being had to the accompanying drawings.

My invention relates to optical elements of the general character contemplated in Letters Patent of the United States No. 1,271,356 granted to me July 2, 1918, to wit, elements which have an optical surface including both a spherical area and a non-spherical area, which merge into each other without linear demarcation.

My invention is particularly applicable to ophthalmic lenses formed of a single piece of glass of uniform index of refraction and designed to afford different correction for vision at different distances. Ordinarily, such lenses are merely bifocal, including a major area, of uniform focus, adapted for distant vision, and a minor area, of different but uniform focus, adapted for near vision; said areas, immediately adjoining each other and having a distinct line of division between them; said line being manifested either by an offset ledge, formed by the abrupt termination of the respective focal areas in different planes, or by a ridge at the junction of said surfaces in a plane common to both of them. All such lenses of the prior art produce aberration of vision through the region of the junction of their respectively different focal areas, and the object of substantially all patented improvements in such lenses has been the formation of the differently curved surfaces with a sharply defined junction line between them; it being assumed that such aberration would be minimized in correspondence with the sharpness of such junction lines. However, such aberration is due to the formation of double, relatively displaced, images of every object seen through the linear junctions of said different focal areas due to the abrupt juxtaposition of the edges thereof in such angular relation as to produce a prismatic effect, and the formation of such double images is neither prevented nor minimized by the sharpening of the junction lines which has been the object of the prior art. Such aberration is particularly objectionable in vision which is downcast to the degree necessary to descend stairs, because such aberration is then manifested by double vision of the successive steps, making it impossible for the wearer of such lenses to precisely determine the location of the edges of the step treads; and the danger of such lenses under such circumstances is recognized in text books relating to the art of fitting such lenses, which instruct that purchasers of such lenses should be cautioned to avoid dependence upon vision through them under such circumstanes.

It is an object of my invention to avoid the objections aforesaid with reference to ordinary lenses intended for bifocal vision, by providing lenses with a multifocal surface which is smoothly continuous from the top to the bottom thereof although of different dioptric curvature in different regions, so that the upper portion affords the proper correction for distant vision and the lower portion affords the proper correction for near vision and the region between the two extremes is of an intermediate curvature; the advantage of such construction and arrangement being that vision through any portion of said surface affords a single continuous visual image, instead of the double, relatively displaced, images which are characteristic of the bifocal lenses of the prior art.

However, as hereinafter described, an ophthalmic lens may be formed in accordance with my invention including two areas of respectively different dioptric power, merged into each other without any line of demarcation, and without any intermediate region which is distinct in dioptric power from either of said areas, one of said areas forming what is known as a truly "spherical" lens, and the other of said areas including what are termed "cylindrical components or elements" in transverse relation or forming what is termed a "cross cylinder," which is equivalent to a truly spherical lens. In such a bifocal lens; the two areas have a common curvature at their junctions, upon both sides of the glass, although the junction curvature may be different upon the opposite sides of the glass, and the cross cylinder aforesaid is formed by toric surfaces upon opposite sides of the glass, the so called cylindrical elements of said toric surfaces having their axes at right angles to each other. A truly cylindrical surface is straight in any plane radial to the axis of generation of the cylinder and, in the optical trade, the portion of such a surface which is thus straight is termed the "cylindrical axis" and "cylindrical element" of such surface and, adapting that nomenclature to toric surfaces, the portion of such a surface which is most nearly straight *i. e.*, the portion having the curvature of greatest radius, is termed the "cylindrical axis" and "cylindrical element" of such toric surface, and it is such cylindrical elements of toric surfaces which have their axes at right angles to each other as above contemplated, and thus form a "cross cylinder," which is equivalent to a truly spherical lens.

Regardless of whether there is or is not such intermediate zone of distinct dioptric power, and regardless of whether either of the regions adjoining the junctional zone of common curvature is truly spherical or has a cylindrical component, and regardless of whether any such cylindrical component has its axis in parallel relation or in transverse relation to such junctional common curvature; any optical element, whether concave or convex, to be provided with a surface of revolution in accordance with the specific method herein claimed, must have such a common curvature conforming to a circular arc in a plane at right angles to the axis of generation of such surface and concentric with that axis, and also conform to circular arcs concentric to that axis in every plane parallel with that junctional plane. However, the curvature of regions of such surface extending from such junction, in either direction, may be of any desired optical character in any plane radial to said axis of generation. Of course, if the latter curvature is circular and of the same radius as the junctional curvature, then the surface coinciding therewith is spherical. If the curvature in such plane radial to the axis of generation is of less radius than the junctional curvature, then the surface coinciding therewith has a cylindrical component with its axis parallel with said junctional curvature; and if the curvature in such radial plane is of greater radius than said junctional curvature, then the surface coinciding therewith has a cylindrical component with its axis in a plane at right angles to the plane of said junctional curvature, and, of course, in a plane radial to said axis of generation. Of course, if such radius is infinite, and the surface consequently straight in such radial plane, such surface is truly cylindrical. Any visual image seen through an optical surface having a cylindrical component appears either magnified or minified transversely to the cylindrical axis of such surface, according to whether the surface is convex or concave; but such unequal refractive effect may be equalized by another cylindrical component having the opposite effect. That is to say, the refractive effect may be rendered uniform in every direction by embodying two cylindrical elements in the same area of a lens, either in crossed relation, or with their axes in the same plane, depending upon whether they are of the same sign (plus or minus) or of opposite sign. So that, in accordance with this invention, optical elements may be produced with any desired optical power upon opposite sides of such junctional region of common curvature.

As hereinafter described, such multifocal optical elements may be surfaced by means of laps having corresponding surfaces, by relative oscillation of the glass and lap in the direction of the junctional common curvature above described. That is to say, the surface thus produced is a surface of revolution, the axis of generation of which extends through a center of said common curvature; each entire surface of such a lens being curved with reference to a single axis of generation of that surface but with zones of different dioptric powers at different distances from said axis; said zones merging into each other, as generically claimed in said Letters Patent.

My invention includes the various novel features of construction, arrangement and procedure hereinafter more definitely specified.

In said drawings: Figure I is an elevation of the inner face of a multifocal ophthalmic lens embodying my invention and adapted for correction of presbyopic vision. Fig. II is vertical sectional view of said lens taken on the line II, II in Fig. I. Fig. III is an elevation of the inner face of a multifocal ophthalmic lens embodying my invention and adapted for correction of myopic vision. Fig. IV is a vertical sectional view of said lens, taken on the line IV, IV in Fig. III. Fig. V is a plan view of multifocal lap embodying my invention, which may be employed to surface the inner face of the lens shown in Fig. I. Fig. VI is a vertical sectional view of said lap, taken on the line VI, VI in Fig. V. Fig. VII is an inverted plan view of said lap. Fig. VIII is a vertical sectional view of a modified form of lap embodying my invention, which may be employed to surface the outer face of the lens shown in Fig. II. Fig. IX is an elevation of a multifocal element embodying my invention, with an intermediate transition zone.

Referring to Figs. I and II; the glass disk 1 has throughout its semicircular area 3, above its geometrical center, a spherical surface of —6 diopters curvature, terminating at the horizontal diameter of the glass disk indicated by the dotted line 4, which diameter is known to opticians as the "180 degree axis." Said disk 1 has, throughout its semicircular area 5, below said line 4, a toric surface which is of −6 diopters curvature horizontally, so as to merge into said spherical surface, at the diameter 4, but has a curvature of −4 diopters at right angles to said line 4 and at what opticians term its "90° axis," indicated by the dotted line 6 in Fig. I. That is to say; said inner toric surface of the disk 1 has its cylindrical element or axis extending vertically. Said disk 1 has, upon its outer face indicated in Fig. II, and throughout the semicircular area above said diametrical line 4, a spherical surface of +7 diopters curvature and said disk 1 has, upon its outer face, throughout the semicircular area below said line 4, a toric surface which has a curvature of +7 diopters horizontally, so as to merge into said upper spherical surface, but has, at right angles thereto, and at its 90° axis aforesaid, a curvature of +9 diopters. That is to say; said outer toric surface of the disk 1 has its cylindrical element or axis extending horizontally. Consequently, the upper semicircular area of said disk 1 is a spherical lens of +1 dioptric power, whereas, the lower semicircular area of said disk 1 is a cross cylinder affording refracting power so much greater than that of the upper semicircular area 3 that said upper area 3 may be used for distant vision, and the lower area 5 for reading, by a person with presbyopic vision. The addition of the respective refractive powers of said crossed cylindrical components in said area 5 produces an aggregate refractive power substantially equivalent to that of a spherical lens of +5 diopters; but, of course, differing from such a spherical lens in that the power is disposed cylindrically; the difference between the concave and convex surface curvatures in the 90 degree plane of section of said area 5 shown in Fig. II, and all planes parallel to that plane, being +4 diopters, whereas, the difference between the concave and convex surface curvatures in the 180 degree plane of said disk 1, and all planes parallel to that plane, throughout said area 5, being but +1 diopter; so that any object viewed through said area 5, for instance, a type imprint, is magnified vertically in proportion to its width. Such cylindrical refractive effect is due to the fact that said crossed cylindrical components are of opposite sign, to wit, one plus and the other minus, in conformity with the meniscus shape of said disk 1 in which they are embodied. If the cylindrical components were both of the same sign, as in a double convex lens, where both may be plus, or in a double concave lens, where both may be minus; the respective refractive powers of such crossed cylindrical components would merge with substantially the same refractive effect in both the 90 degree and 180 degree axes of the lens in equivalency to a truly spherical lens, as above contemplated. Moreover, the refractive effect of a cylindrical component of either sign, (plus or minus) is equivalent to the refractive effect of a cylindrical component of the opposite sign, if its axis is at right angles thereto. For instance, the minus cylindrical component having its axis at 90 degrees in Figs. I and II is the refractive equivalent of the plus cylindrical component having its axis at 180 degrees in said figures. So that such cylindrical components may be readily transposed to whichever sign and axis may be most conveniently embodied in the form of lens to be made, and such substantially uniform refractive effect as is characteristic of a truly spherical lens may be produced by embodying cylindrical components of opposite sign upon opposite surfaces of the lens provided that their axes are in the same plane, for instance, both at 90 degrees as is the minus cylindrical component in the disk 1, or both at 180 degrees as is the plus cylindrical component in that disk.

Referring to Figs. III and IV; the glass disk 8 has, throughout its upper semicircular area 10, a spherical surface of −6 diopters, terminating at its 180 degree axis, to wit, the horizontal diameter of the glass indicated by the dotted line 11. Said disk 8 has, throughout its semicircular area 12, below said line 11, a toric surface which is −6 diopters curvature horizontally, so as to merge into said spherical surface, at the diameter 11, but has a curvature of −4 diopters at its 90° axis, indicated by the dotted line 14, at right angles to said line 11. That is to say; said inner toric surface of the disk 8 has its cylindrical element or axis extending vertically. Said disk 8 has, upon its outer face indicated in Fig. IV, and throughout the semicircular area above said diametrical line 11, a spherical surface of +3.25 diopters curvature, and said disk 8 has, upon its outer face, throughout the semicircular area below said line 11, a toric surface which has a curvature of +3.25 diopters horizontally, so as to merge into said upper spherical surface, but has, at right angles thereto, to wit, at its 90° axis aforesaid, a curvature of +5.25 diopters. That is to say; said outer toric surface of the disk 8 has its cylindrical element or axis extending horizontally. Consequently, the upper semicircular area of said disk 8 is a spherical lens of −2.75 dioptric power, whereas, the lower semicircular area of said disk 8 is a cross cylinder affording refracting power so much less than that of the upper semicircular area 10, that said upper area 10 may be used for distant vision and the lower area 12 for reading, by a person with myopic vision.

As before noted; the lens shown in Figs. I and II is adapted for correction of presbyopic vision and the lens shown in Figs. III and IV is adapted for correction of myopic vision. However, both of said lenses and, of course, lenses of any other curvatures, may be surfaced by means of laps such as shown in Figs. V to VIII inclusive, provided such laps have multifocal surfaces oppositely counterpart to the surfaces it is desired to impose upon the glass. That is to say; such a multifocal optical element, to be used as a lap, must have its working face in such opposite relation to the surface to be generated, or polished, as to impose the latter surface upon the glass or other material of which it is being formed.

The lap shown in Figs. V to VII inclusive is conveniently formed of two iron castings, 15 and 16, the former having a spherically curved surface 17 and the latter a torically curved surface 18; said differently curved surfaces having a common curvature at the junction line 19, which is the line of division between said castings. Said castings have complementary lugs 21 and 22 which form an oblong boss of standard shape and dimensions designed to fit in commercial adapters for connection with rotary spindles of commercial surfacing mechanisms. I find it convenient to rigidly couple the lap sections 15 and 16 by the screws 23 and 24, respectively engaged in the threaded holes 25 and 26 in said lugs 21 and 22, and respectively extending through the smooth holes 27 and 28 in said lugs; said smooth holes being large enough to permit relative adjustment of said sections to prevent a smoothly continuous working face.

I find it convenient to employ laps of the sectional form above described, to minimize the number of tools required to meet the trade requirements for bifocal lenses; as such toric lap sections, of different proportions, may be interchangeably connected with a single spherical lap section, provided, of course, that they have a common curvature at their junction. However, laps having such multifocal surfaces as above described may be formed of a single piece of metal, or other material; such multifocal surfaces as described being readily formed by the commercial "radius cutters" and "radius grinders" ordinarily employed for forming toric surfaces upon laps. Fig. VIII illustrates such a one piece multifocal lap 29 having its working face concavely curved; the semicircular area 30 thereof being spherically curved in opposite correspondence with the upper outer surface of said disk 1, and the semicircular surface 31 of said lap 29 being curved in conformity with the lower outer toric surface of said disk 1; said two surfaces 30 and 31 having a common curvature at the plane indicated by the dotted line 32, which does not, however, indicate any linear demarcation of said surfaces, which smoothly merge into each other.

It may be observed that both the lenses above described respectively with reference to Figs. I and III, are strictly bifocal; each having areas of respectively different refracting power respectively formed of opposite spherical surfaces and opposite crossed cylindrical elements of toric surfaces, immediately joining each other without even a linear demarcation between them or anything to interrupt the smooth continuity of the curvature of the surfaces of the lens upon either side of the piece of glass forming it. However, it is to be understood that, as indicated in Fig. IX, a multifocal element embodying my present invention and, including areas of different dioptric curvature respectively formed by a spherical surface 34 and by a toric surface 35, may include an intermediate zone 36 of such curvature as to afford a gradual transition in dioptric power from said spherical surface to said toric surface, as contemplated in my Letters Patent aforesaid. For instance; such a zone may be bounded upon its upper edge by the horizontal diameter 38 of the lens (its 180 degree axis) and be bounded upon its lower side by a plane 39 parallel with said axis, say four or five millimeters distant therefrom; the curvature of the surface of said element at the latter plane being common to the areas respectively extending above and below the same. Of course, as such a plane of junction as last above contemplated is not a diametrical plane with reference to the spherical surface extending above it, it affords a junction of less radius of curvature than a diametrical junction and is correspondingly stronger in dioptric power in accordance with its distance from such diameter.

Although the lenses which I have chosen for illustration have both of their surfaces which are respectively inner and outer, with reference to the eyes of the wearer, of multifocal character; I do not desire to limit myself to such embodiments of my invention, for it is obvious that a lens may be formed with but one of its opposite surfaces of such multifocal character and the other of uniform dioptric power, plane, spherically convex or concave, or cylindrically convex or concave. Of course, the optical power of such lenses as above described, is determined by the shape of their mass and relative position of their surfaces, regardless of their location in space; but, when used for ophthalmic purposes, their position relative to the eyes of the user is important; for the effect of any such lenses upon the vision of the wearer depends upon whether its area of greater or less refractive power is above or below its 180 degree axis. For instance, in the lens 1, shown in Fig. II, the area of greater power is below such axis; but in the lens 8, shown in Fig. IV, the area of greater power is above. However, whether the upper or the lower area shall include a cylindrical element or crossed cylindrical elements, such as described, is merely a matter of convenience.

Moreover, although I have illustrated my invention as embodied in ophthalmic lenses; it is to be understood that it may be embodied in lenses adapted for other purposes and in other optical elements, whether refractors, or reflectors or refracting reflectors. For instance, any of the elements illustrated may be provided with an opaque surface to form a refracting mirror, or a substantially total reflecting mirror, or, an opaque element (such as the laps aforesaid) may be provided with a surface curved in accordance with my invention to form a substantially total reflector. Such reflectors may, for instance, be placed behind the source of light in a vehicle lamp, to distribute the light both distally and locally, laterally, immediately in front of the vehicle.

Of course, such construction and arrangement as above described connote that, in each instance, the axis of generation of the multifocal surface is an axis of symmetry with reference to which the different areas of such surface are disposed, and is the locus of the centers of the spherical curves contemplated. In other words; the multicurved surface of each of the optical elements above described, including both lenses and laps, is generated by movement of a compound curve with reference to a circular directrix and an axis of generation concentric with the directrix.

For instance, in Fig. II, the axis of generation of the convex surface of the disk 1 is indicated at 41, and the axis of generation of the concave surface of said disk is indicated at 42, and, in each case, the directrix coincides with the zone of common curvature of the different areas of the respective surface. Although I have shown said axes 41 and 42 in parallel relation; they may be relatively inclined to equalize the thickness of the opposite edges of said disk. Moreover, although I have indicated the principal focal axis of said disk, normal to its geometrical center, as the locus of all of the centers of curvature of the different areas of said disk, that is not essential, and, of course, would not be the case if the axis 41 and 42 were relatively inclined.

It is to be understood that the lenses above described may be surfaced by oscillating the pieces of glass of which they are formed, upon laps having suitably curved areas; such oscillations being in the direction of the junction of the different dioptric elements of the surfaces being formed, and such oscillation may, of course, be effected by hand, but may be more rapidly effected by any suitable mechanism, for instance such as is disclosed in my application Serial No. 344,465 filed Dec. 12, 1919, for Letters Patent of the United States, which is copending herewith. Such surfaces as shown and described with reference to Figs. I, III and V, may be formed by limiting such oscillation to a single plane; but such a surface as shown and described with reference to Fig. IX may be formed by permitting the optical element which is to form the lens and the optical element which is the forming lap, freedom for oscillation axially with respect to their common axis of oscillation (which is the axis of generation of the surface being formed) to the extent of the width of the zone 36 indicated in Fig. IX. However, freedom for some such axial movement, to even a slight extent, is advantageous in forming surfaces of the type contemplated in said Figs. I, III and V, because it permits decussative movements of the particles of abrading material and thus avoids the formation of ruts and scratches which are occasioned by forcing the particles of abrading material to repeatedly traverse the same path.

Therefore, I do not desire to limit myself to the precise details of construction, arrangement and procedure herein set forth, as it is obvious that various modifications may be made therein without departing from the essential features of my invention, as defined in the appended claims.

I claim:

1. An optical element having one side surface including a spherical area and an area with a cylindrical component.

2. An optical element having one side surface including a spherical area and a toric area.

3. An optical element having one side surface including a spherical area and an area with a cylindrical component; and having adjacent edges of said areas merged in a region of common curvature.

4. An optical element having one side surface including a spherical area and a toric area; and having adjacent edges of said areas merged in a region of common curvature.

5. An optical element having one side surface including a spherical area and an area with a cylindrical component, and having adjacent edges of said areas merged in an intermediate transition zone.

6. An optical element having one side surface including a spherical area and an area with a cylindrical component, and having adjacent edges of said areas merged in an intermediate transition zone; said surface being smoothly continuous throughout said areas and zone.

7. An optical element having one side surface including distinct areas upon respectively opposite sides of its geometrical center, one area being spherical and another including a cylindrical component.

8. An optical element having each side surface including distinct areas, one area being spherical and another including a cylindrical component.

9. An optical element having each side surface including distinct areas, one area being spherical and another including a cylindrical component; said spherical areas being opposite each other.

10. An optical element having each side surface including distinct areas, one area being spherical and another including a cylindrical component; said cylindrical components being in cross relation.

11. A multifocal ophthalmic lens having one side surface including a spherical area and an area with a cylindrical component; said areas extending respectively above and below the 180 degree axis of said lens.

12. A multifocal ophthalmic lens having one side surface including a spherical area and a toric area; said areas extending respectively above and below the 180 degree axis of said lens.

13. A multifocal ophthalmic lens having each side surface including a spherical area and a toric area; said areas extending in opposite directions from a medial region of said lens; said toric areas being in transverse relation to each other.

14. A multifocal ophthalmic lens having each side surface including a spherical area and a toric area; said areas extending respectively above and below the 180 degree axis of said lens; said toric areas being in cross relation; below said axis.

15. An ophthalmic lens having one surface which is of different dioptric curvature at different regions respectively spherically and torically curved; said surface being part of a surface of revolution with respect to a single axis of rotation transverse to the plane of the junction between said regions.

16. An ophthalmic lens having one surface which is smoothly continuous throughout its area but of different dioptric curvature at different regions; regions respectively above and below the geometrical center of the lens being respectively spherically and torically curved; said regions having a common curvature at their junction; said surface being part of a surface of revolution with respect to a single axis of rotation transverse to the plane of the junction between said regions.

17. An ophthalmic lens formed of a single piece of glass of uniform index of refraction, having one surface which is smoothly continuous throughout its area but of different dioptric curvature at different regions; regions respectively above and below the geometrical center of the lens being respectively spherically and torically curved; said regions having a common curvature at their junction; said surface being part of a surface of revolution with respect to a single axis of rotation normal to the plane of the junction between said regions.

18. An ophthalmic lens having one surface which is of different dioptric curvature at different regions respectively spherically and torically curved; said surface being part of a surface of revolution with respect to a single axis of rotation transverse to the plane of the junction between said regions; said lens having its opposite surface of different dioptric curvature at different regions, respectively spherically curved and torically curved.

19. An ophthalmic lens having one surface which is of different dioptric curvature at different regions respectively spherically and torically curved; said surface being part of a surface of revolution with respect to a single axis of rotation transverse to the plane of the junction between said regions; said lens having its opposite surface of different dioptric curvature at different regions, respectively spherically curved and torically curved; the toric curvatures upon opposite surfaces of said lens forming a cross cylinder.

20. An ophthalmic lens formed of a single piece of glass of uniform index of refraction, having one surface which is smoothly continuous throughout its area but of different dioptric curvature at different regions; regions respectively above and below the geometrical center of the lens being respectively spherically and torically curved; said regions having a common curvature at their junction; said surface being part of a surface of revolution with respect to a single axis of rotation normal to the plane of the junction between said regions; said lens having its opposite surface smoothly continuous throughout its area but of different dioptric curvature at different regions; regions respectively above and below the geometrical center of the lens being respectively spherically curved and torically curved; said regions having a common curvature at their junction; the toric curvatures upon opposite surfaces of said lens forming a cross cylinder.

21. A method of forming an optical element having one side surface including a spherical area and an area with a cylindrical component; which consists in relatively turning said element in coöperative relation with another element having one side surface including a spherical area and an area with a cylindrical component; such turning movement being in the direction of the junction between said areas and upon an axis of generation of said surface, common to both of said elements.

22. A method of forming an optical element with a smoothly continuous surface, including a spherical area and an area with a cylindrical component, which consists in turning the element to be thus surfaced in coöperative relation with another element having an oppositely counterpart surface; such turning movement being in the direction of the junction between said areas and upon an axis of generation of said surface, which axis is common to both of said elements.

23. An optical element having one side surface including areas of respectively different dioptric power generated from a single axis of revolution and merged in a common circular curvature in a junction plane transverse to said axis of revolution; all of said surface coinciding with circular arcs concentric with said axis of revolution in all planes parallel to said junction plane; and one of said areas including a cylindrical component.

In testimony whereof, I have hereunto signed my name at Philadelphia, Pennsylvania, this twentieth day of October, 1919.

ARTHUR E. PAIGE.

Witnesses:

FRANK E. PAIGE,
CAROLYN E. REUTER.